US007271716B2

(12) United States Patent
Nou

(10) Patent No.: US 7,271,716 B2
(45) Date of Patent: Sep. 18, 2007

(54) EMERGENCY SAFETY SERVICE SYSTEM AND METHOD USING TELEMATICS SYSTEM

(75) Inventor: Seong Taeg Nou, Icheon-shi (KR)

(73) Assignee: Hyundai Autonet Co., Ltd., Icheon-Shi (KR)

( * ) Notice: Subject to any disclaimer, the term of this patent is extended or adjusted under 35 U.S.C. 154(b) by 213 days.

(21) Appl. No.: 11/160,677

(22) Filed: Jul. 5, 2005

(65) Prior Publication Data

US 2006/0033615 A1 Feb. 16, 2006

(30) Foreign Application Priority Data

Aug. 12, 2004 (KR) ...................... 10-2004-0063453

(51) Int. Cl.
*G08B 1/08* (2006.01)
*H04Q 7/00* (2006.01)

(52) U.S. Cl. ................. 340/539.13; 340/438; 340/506; 701/45; 701/36

(58) Field of Classification Search ........... 340/539.13, 340/506, 436, 438; 701/45, 46, 12, 36, 129, 701/213, 117
See application file for complete search history.

(56) References Cited

U.S. PATENT DOCUMENTS 6,459,988 B1 * 10/2002 Fan et al. ................... 701/213
7,091,851 B2 * 8/2006 Mason et al. .......... 340/539.13
7,180,407 B1 * 2/2007 Guo et al. .................. 340/436
2003/0149530 A1 * 8/2003 Stopczynski ................ 701/301
2003/0182035 A1 * 9/2003 DiLodovico et al. ......... 701/35
2003/0199260 A1 * 10/2003 Casey et al. ............. 455/150.1
2004/0088090 A1 * 5/2004 Wee ............................ 701/35
2005/0186941 A1 * 8/2005 Gault et al. ................. 455/411

FOREIGN PATENT DOCUMENTS

KR 1020030054655 7/2003
KR 1020040033101 4/2004
KR 1020040035290 4/2004
KR 1020040035295 4/2004
KR 1020040035297 4/2004
KR 1020040049650 6/2004

* cited by examiner

*Primary Examiner*—Jeffery Hofsass
*Assistant Examiner*—Hoi C. Lau
(74) *Attorney, Agent, or Firm*—IPLA P.A.; James E. Bame

(57) ABSTRACT

An emergency safety service system and method using the telematics system is provided. The emergency safety service system includes: a telematics device for capturing an image from a peripheral situation, collecting condition information and position information, and generating an emergency safety information signal; a service providing server for receiving the emergency safety information signal, detecting and analyzing the position information, retrieving the nearest rescue teams to the accident car, and generating and transmitting an emergency safety request signal; and a rescue team terminal for alarming that there is an emergency safety request, detecting the position information, and displaying a position of the accident car.

7 Claims, 9 Drawing Sheets

EMERGENCY SAFETY SERVICE SYSTEM AND METHOD USING TELEMATICS SYSTEM

BACKGROUND OF THE INVENTION

1. Field of the Invention

The present invention relates to a telematics system, and more particularly, to an emergency safety service system and method for when a traffic accident occurs, automatically or manually informing a rescue team, such as a police station, a hospital, a fire department and a car service center, of an emergency situation, using the telematics system.

2. Description of the Related Art

Due to the improvement of a national living standard, domestic supplied cars are being rapidly increased in number. Current domestic holdup of cars is of one vehicle per household. As the cars are increased in number, it is a trend that traffic congestion and its resultant traffic accident are being increased.

In many cases, when the traffic accident occurs, drivers conflict with one another to place the blame upon one another or reduce their own blames. At this time, due to the absence of evidence retention, the drivers are placed under disadvantageous circumstances.

Further, when a fatal accident such as a personal accident occurs, an accident party, a counterpart or a third party reports to any one of rescue teams. The rescue team is a term including a police station, a fire department, a hospital or an emergency medical dispatch, and a car service center. Then, the rescue team receives an accident report, makes contact with other rescue teams, and takes mobilization to an accident scene.

Since the accident parties are confused by the traffic accident, it is difficult for the parties to make contact with the police station, the hospital or the like under their emergency situations. Further, until the accident counterpart (that is, an injurer) or the third party perceives damage situation of the accident party with his/her naked eyes, he/she does not report the accident to the rescue team due to non-awareness of seriousness of the accident, thereby causing an accident report to be long deferred.

As described above, there is a drawback in that many sufferers and injurers have a great conflict due to the absence of exact evidence retention of the traffic accident.

Further, there is a drawback in that even when the drivers are heavily injured due to a fatal traffic accident, the rescue team such as the police station and the hospital cannot be quickly informed, thereby jeopardizing drivers' lives.

Furthermore, there is a drawback in that a quick post-action cannot be taken in the traffic accident, thereby resulting in the traffic congestion.

SUMMARY OF THE INVENTION

Accordingly, the present invention is directed to an emergency safety service system and method using a telematics system that substantially overcomes one or more of the limitations and disadvantages of the conventional art.

An object of the present invention is to provide an emergency safety service system and method for when a traffic accident occurs, accurately and rapidly informing a rescue team of an accident situation and a condition and position of an accident car and requesting the rescue team for emergency safety, using the telematics system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided an emergency safety service system using a telematics system having a mobile communication network, the system including: a telematics device for, on the generation of an accident notification signal resulting from a traffic accident, capturing an image from a peripheral situation of an accident scene, collecting condition information and position information of an accident car, and generating an emergency safety information signal having the condition information, the position information, and the captured image; a service providing server for receiving the emergency safety information signal through the mobile communication network, detecting and analyzing the position information from the emergency safety information signal, retrieving the nearest rescue teams to the accident car, and generating and transmitting an emergency safety request signal having the position information to the retrieved rescue teams through an Internet network; and a rescue team terminal for, on the reception of the emergency safety request signal through the Internet network, alarming that there is an emergency safety request, detecting the position information from the emergency safety request signal, and displaying a position of the accident car.

In another aspect of the present invention, there is provided an emergency safety service method using a telematics system having: a telematics device having a key input unit with an emergency safety service key, a plurality of sensors, and a vehicle condition detector for receiving measurement values from the sensors and generating vehicle diagnosis information; a mobile communication network; a service providing server wireless connecting with the telematics device through the mobile communication network; and a plurality of rescue team terminals connecting with the service providing server through an Internet network, the method including the steps of: in the telematics device, on the generation of an accident notification signal resulting from a traffic accident, capturing an image from a peripheral situation of an accident scene, collecting condition information and position information of an accident car, and generating an emergency safety information signal having the condition information, the position information, and the captured image; in the service providing server, receiving the emergency safety information signal through the mobile communication network, detecting and analyzing the position information from the emergency safety information signal, retrieving the nearest rescue teams to the accident car, and generating and transmitting an emergency safety request signal having the position information to the retrieved rescue teams through the Internet network; and in the rescue team terminal, on the reception of the emergency safety request signal through the Internet network, alarming that there is an emergency safety request, detecting the position information from the emergency safety request signal, and displaying a position of the accident car.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
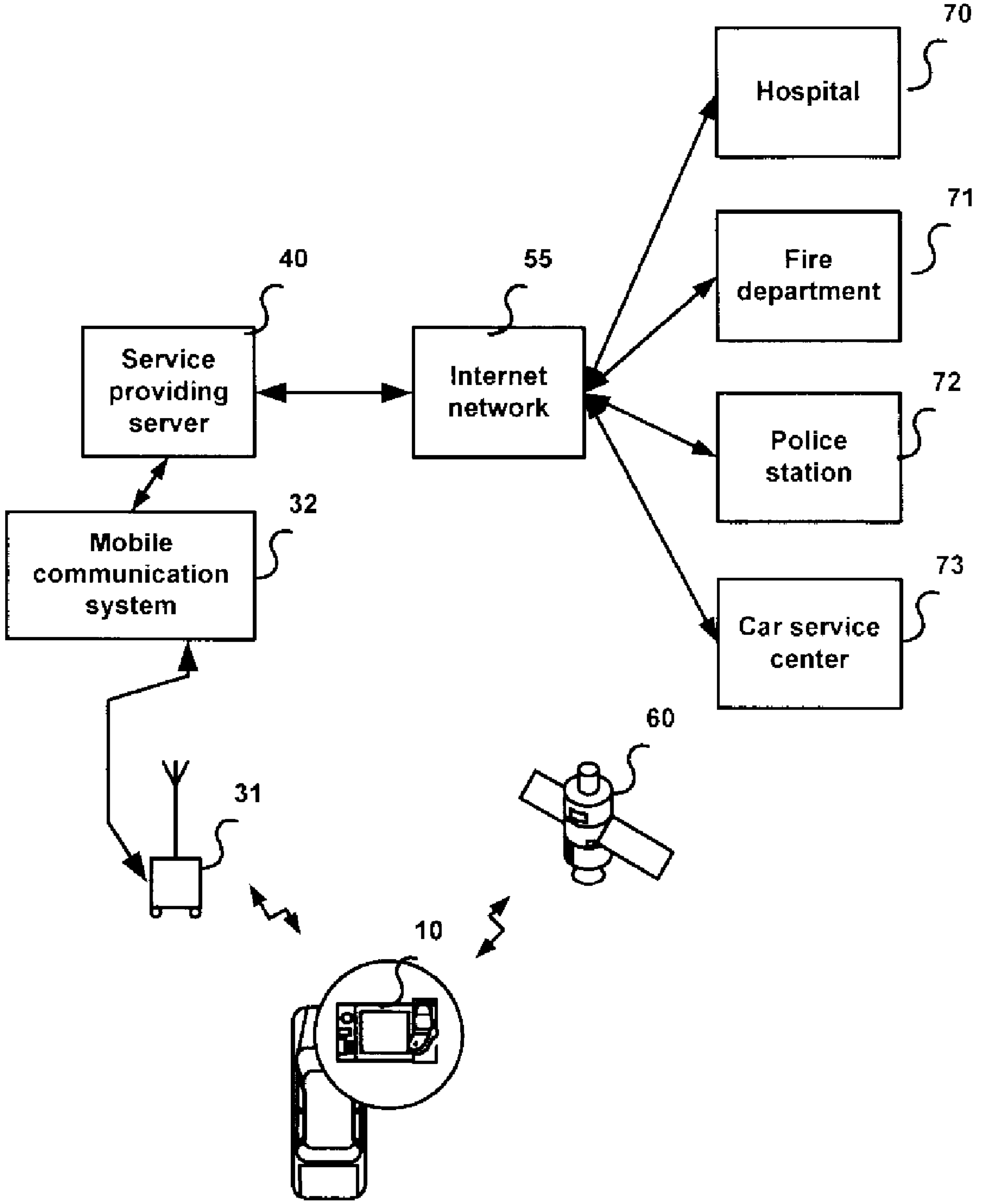
FIG. 1 is a block diagram illustrating a construction of an emergency safety service system using a telematics system according to an embodiment of the present invention.

Reference will now be made in detail to the preferred embodiments of the present invention, examples of which are illustrated in the accompanying drawings. Wherever possible, the same reference numerals will be used throughout the drawings to refer to the same or like parts.

Telematics system refers to a system using an integrated type mobile-based position tracking manner to detect the occurrence of vehicle accident or theft, inform a vehicle owner or a corresponding public office of the occurrence of the vehicle accident or theft, guide a vehicle along a driving path, and provide drivers with a variety of other information. In other words, the telematics system refers to a system for providing a variety of information based on a global positioning system (Hereinafter, referred to as "GPS") and a mobile communication system. Accordingly, the telematics system can provide the drivers with various services, such as traffic information, a coping method to emergency situation, a remote diagnosis of vehicle, and a use of the Internet (for example, financial transaction, news providing, and e-mail communication), using the GPS and the mobile communication system.

The present invention provides an emergency safety service system and method for, when the drivers are placed in a dangerous emergency situation, automatically or manually informing a police station, a fire department, a hospital, a rescue team and a car service center, of a condition and position of a diagnosed vehicle and a condition and peripheral situation of the driver, using the telematics system, and rapidly rescuing the driver from the emergency situation.

FIG. 1 is a block diagram illustrating a construction of the emergency safety service system using the telematics system according to an embodiment of the present invention. The emergency safety service system will be in detail described with reference to FIG. 1 below.

Reference numeral 10 denotes a telematics device installed within a car according to the present invention. The telematics device 10 receives position information of the from an artificial satellite 60, maps the received position information to previously stored map data, and displays a position of the car on a display unit such as a liquid crystal display (LCD). The telematics device 10 diagnoses a car condition using sensors disposed inside or outside of the car, and displays diagnosis information on the car condition on the display unit. The telematics device 10 connects with a mobile communication terminal 10-1 in order to connect with a mobile communication system 32 through a wireless base station 31. The telematics device 10 receives the traffic information through the mobile communication system 32 and the wireless base station 31, and displays the received traffic information on the LCD to inform the driver of a current traffic situation. When the traffic accident occurs, the telematics device 10 having cameras disposed outside and inside of the car transmits an emergency safety information signal, which includes condition and position information of the diagnosed car and image information collected by the camera, to the mobile communication system 32 through the wireless base station 31.

A service providing server 40 is connected with the telematics device 10 through the mobile communication system 32, and provides a traffic situation notification service to transmit a traffic situation of a road to the telematics device 10 of the car running on the road. The service providing server 40 provides a remote diagnosis service to receive vehicle diagnosis information from the telematics device 10 and inform the telematics device 10 of an accident management situation based on the received diagnosis information. The service providing server 40 receives the emergency safety information signal from the telematics device 10 through the mobile communication system 32, and transmits an emergency safety request signal, which includes the condition information, the geographical position information and peripheral situation information of the accident car, to a hospital 70, a fire department 71, a police station 72 and a car service center 73 through an Internet network 55. Each terminal (later described) of the hospital 70, the fire department 71, the police station 72 and the car service center 73 receives the emergency safety request signal from the service providing server 40 through the Internet network 55, alarms a doctor, a fireman, a policeman and a service center personnel, and displays a current condition of an accident scene so that they can understand the accident situation and be at once mobilized.

Figure 2:
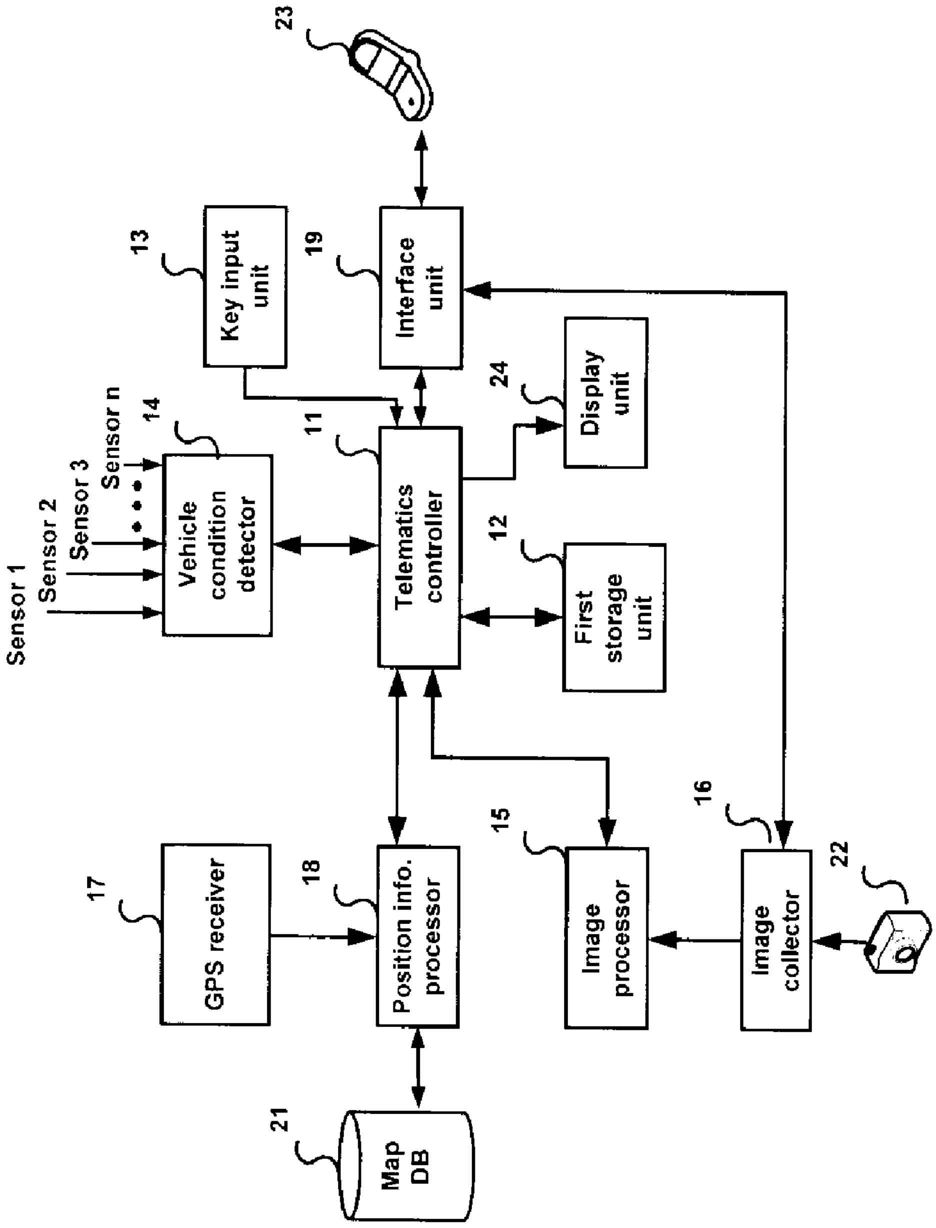
FIG. 2 is a block diagram illustrating a construction of a telematics device of FIG. 1.
Figure 8:
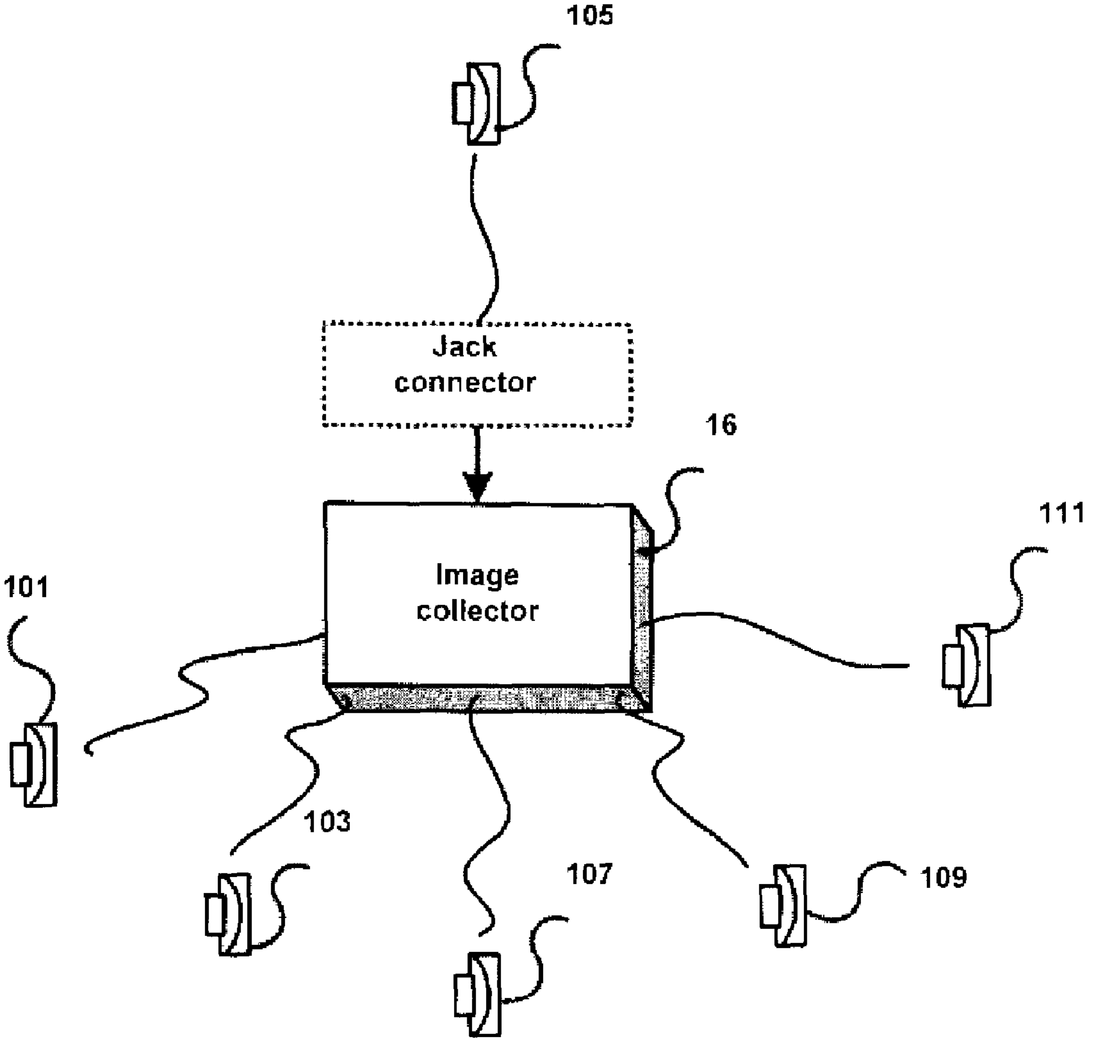
FIG. 8 illustrates the number and kind of cameras installed in a car and a telematics device according to an embodiment of the present invention.
Figure 9:
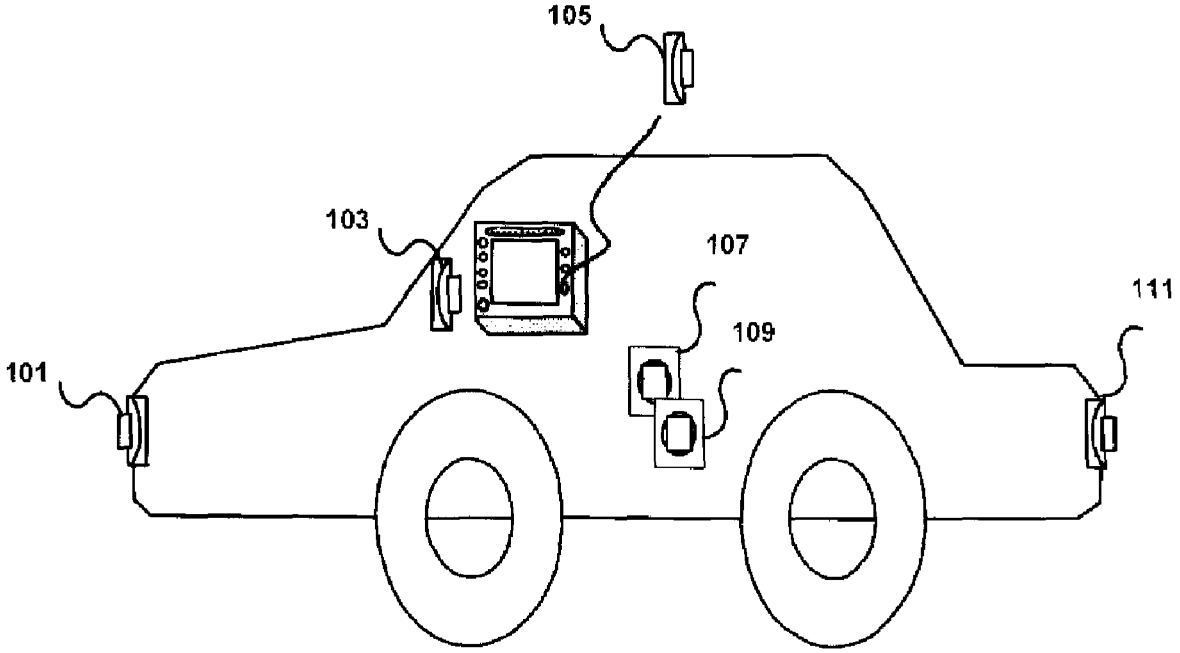
FIG. 9 illustrates an example of FIG. 8 applied to a car.

FIG. 2 is a block diagram illustrating a construction of the telematics device of FIG. 1. FIG. 8 illustrates the number and kind of cameras installed in the car and the telematics device according to an embodiment of the present invention. FIG. 9 illustrates an example of FIG. 8 applied to the car. A construction and operation of the telematics device 10 will be described with reference to FIGS. 2, 8 and 9 below.

The telematics device 10 includes a telematics controller 11, a first storage unit 12, a key input unit 13, a vehicle condition detector 14, an image processor 15, an image collector 16, a GPS receiver 17, a position information processor 18, an interface unit 19, a map database 21, and a display unit 24.

The telematics controller 11 controls a general operation of the telematics device 10. The first storage unit 12 includes a Read Only Memory (ROM) for storing a control program controlling the operation of the telematics device 10; a Random Access Memory (RAM) for storing data generated while the control program is enabled; and a flash memory for storing the vehicle diagnosis information, the image information, and the position information. The first storage unit 12 stores vehicle information, that is, information on a car number, an insurance company and the like. The key input unit 13 includes a plurality of keys for setting a function and a mode of the telematics device 10. The key input unit 13 generates and outputs data on a key pressed by the driver to the telematics controller 11. The telematics controller 11 performs a control operation corresponding to the received key data. The display unit 24 displays a variety of information, such as an operation mode and condition of the telematics device 10 and a condition of the car, in a graphic or text format under the control of the telematics controller 11. The display unit 24 can employ the LCD and the like. The interface unit 19 is connected with a Universal Asynchronous Transceiver and Receiver (Hereinafter, referred to as "UART") (not shown) of the mobile communication terminal 23 to wireless connect the telematics device 10 with the wireless base station 31 of FIG. 1. The vehicle condition detector 14 detects a condition signal of each constituent part of the car from a plurality of sensors disposed outside or inside of the car, and inputs the detected condition signals to the telematics controller 11. The sensors can be exemplified as a collision sensor for sensing the collision of a front or rear of the car, an airbag sensor for sensing the activation of an airbag when a sensing value of the collision sensor is larger than a predetermined value, and a check sensor for checking an amount of a car's oil. The telematics controller 11 receives the vehicle diagnosis information from the vehicle condition detector 14, displays the received vehicle diagnosis information on the display unit 24 in the graphic or text format, and stores the vehicle diagnosis information in the flash memory of the first storage unit 12. The image collector 16 collects a plurality of images. In the drawings, reference numeral 22 denotes the camera. The camera 22 being a digital camera can be installed at the vehicle in plural as shown in FIG. 8. For the image collector 16 of FIG. 8, as shown in FIG. 9, cameras 101 and 111 can be respectively disposed at front and rear of the car, cameras 107 and 109 can be respectively disposed at the left and right of the car, and a camera 103 can be disposed inside the vehicle to photograph the interior of the car. The cameras 101, 103, 107, 109 and 111 are fixed to the car. The image collector 16 includes a jack connector 120 for connecting a small-sized mobile digital camera 105. The jack connector 120 can employ a Universal Serial Bus (USB) or IEEE1394. Capturing image data using the USB or IEEE1394 has been known in the art and therefore, its detailed description will be omitted.

The image collector 16 separately collects image information from the plurality of cameras. The image processor 15 receives the image information from the image collector 16, compresses or converts the received image information in format to allow the telematics controller 11 to process the converted image information, and outputs the compressed or converted image information to the telematics controller 11. At this time, the telematics controller 11 stores the received image information in the first storage unit 12.

The GPS receiver 17 receives a position information signal having a high-bandwidth radio frequency from the satellite of FIG. 1, and detects the position information from the received position information signal. The map database (DB) 21 stores national map data. The position information processor 18 receives the position information from the GPS receiver 17, map-matches map data corresponding to a region where the car is positioned, with and depending on the received position information under the control of the telematics controller 11, and outputs the matched map data to the telematics controller 11. The telematics controller 11 receives the matched map data, displays the position of the car on the display unit 24, and stores the displayed position in the first storage unit 12. The stored position information and vehicle diagnosis information is periodically updated.

In case where, on the occurrence of the traffic accident, the driver presses an emergency safety service key in a manual emergency safety service mode set using the key input unit 13, the telematics controller 11 captures the image using the camera 22, the image collector 16 and the image processor 15, and stores the captured image in the first storage unit 12.

The telematics controller 11 wirelessly transmits the vehicle diagnosis information, the position information, and the captured image, from the first storage unit 12 through the interface unit 19 and the mobile communication terminal 23. The vehicle diagnosis information, the position information, and the captured image are transmitted to the service providing server 40 through the wireless base station 31 and the mobile communication system 32.

Figure 3:
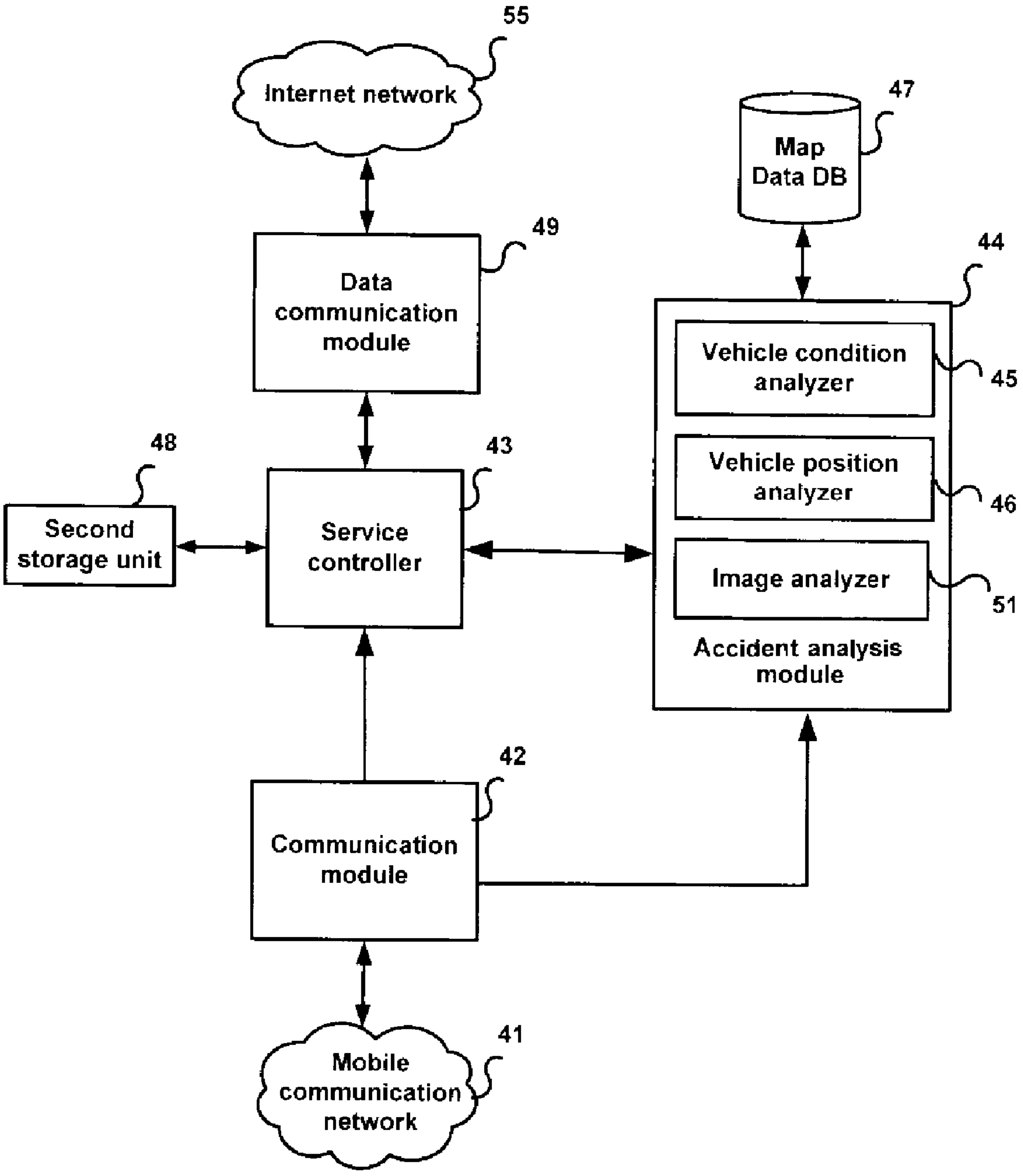
FIG. 3 is a block diagram illustrating a construction of a service providing server of FIG. 1.

FIG. 3 is a block diagram illustrating a construction of the service providing server of FIG. 1. A construction and operation of the service providing server 40 will be described with reference to FIG. 3 below.

The service providing server 40 includes a communication module 42, a service controller 43, a second storage unit 48, a data communication module 49, an accident analysis module 44, and a map database 47.

The communication module 42 is connected with the mobile communication network 41, which includes the mobile communication terminal 10-1, the wireless base station 31, and the mobile communication system 32 of FIG. 1, and communicates with the telematics device 10. The second storage unit 48 includes a ROM for storing a control program controlling a general operation of the service providing server 40; a RAM for storing data generated while the control program is enabled; and a rescue team Internet Protocol (IP) table for requesting emergency safety of the rescue team, that is, the hospital 70, the fire department 71, the police station 72, and the car service center 73. The second storage unit 49 stores emergency safety information. The service controller 43 controls the general operation of the service providing server 40 using the control program. The service controller 43 receives the emergency safety information signal through the communication module 42, detects the emergency safety information from the received emergency safety information signal, stores the detected emergency safety information in the second storage unit 48, and outputs the stored emergency safety information to the accident analysis module 44. The accident analysis module 44 includes a vehicle condition analyzer 45, a vehicle position analyzer 46, and an image analyzer 51. The vehicle condition analyzer 45 detects the vehicle diagnosis information from the emergency safety information, and generates vehicle condition report data based on the detected vehicle diagnosis information. The vehicle position analyzer 46 detects and analyzes the position information of the telematics device 10 of FIG. 1 from the emergency safety information, and generates vehicle position report data based on the detected position information. The image analyzer 51 detects the image information from the emergency safety information. The accident analysis module 44 combines the generated vehicle condition and position report data with the detected image information, to generate and output emergency safety request information to the service controller 43. The service controller 43 retrieves and reads Internet Protocols (IPs) of the nearest rescue teams (that is, the hospital 70, the fire department 71, the police station 72, and the car service center 73) to the accident car, from the second storage unit 48 on the basis of the position information of the vehicle. The service controller 43 transmits the received emergency safety request information to the rescue teams respectively having the retrieved IPs through the data communication module 49 and the Internet network 55.

Figure 4:
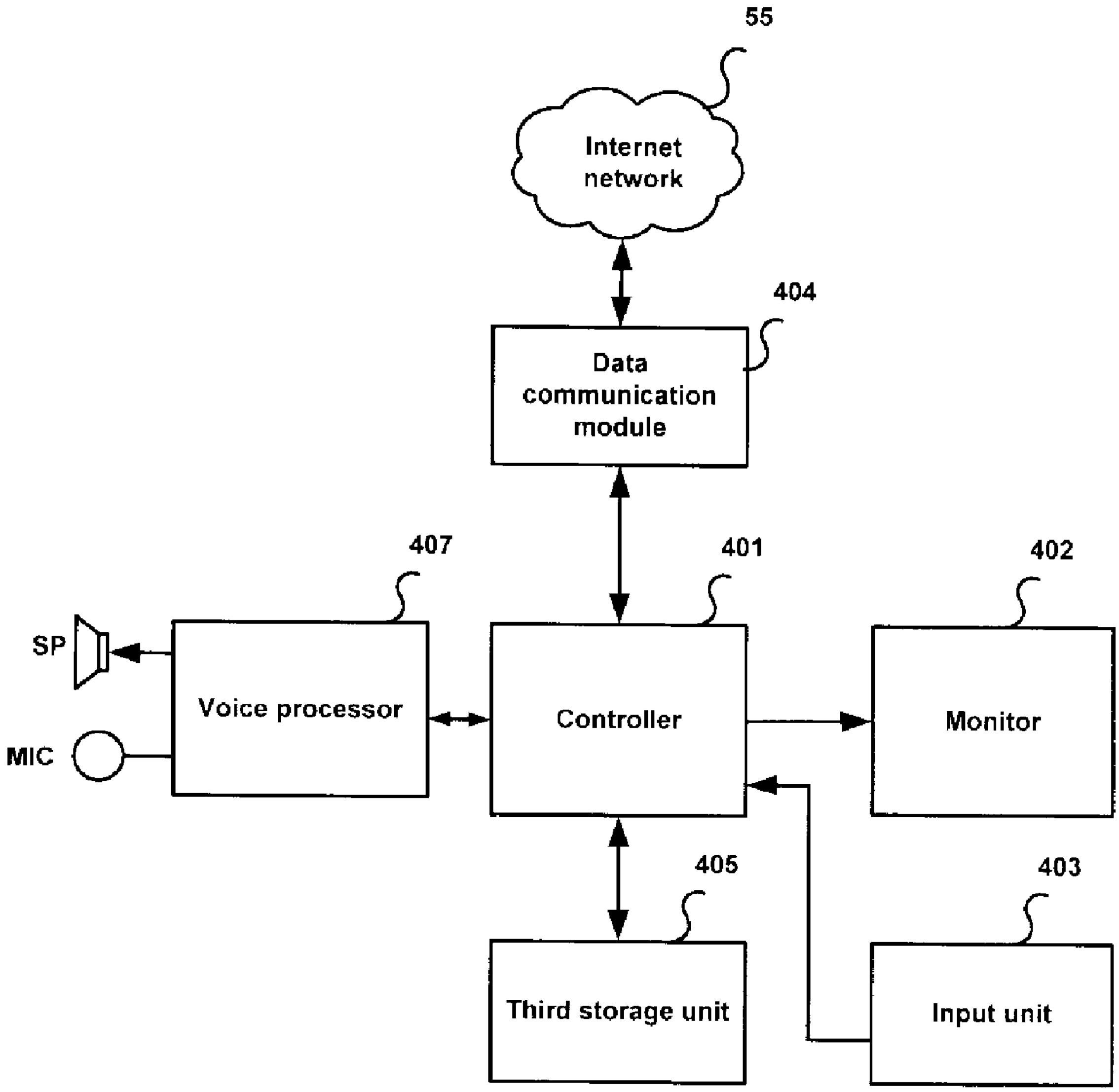
FIG. 4 is a block diagram illustrating a construction of an emergency safety informing device, which is installed in a hospital, a fire department, a police station or the like of FIG. 1.

FIG. 4 is a block diagram illustrating a construction of an emergency safety informing device, which is installed in the hospital, the fire department, the police station or the like of FIG. 1.

Referring to FIG. 4, the emergency safety informing device (that is, terminal) of the rescue team includes a controller 401, a monitor 402, an input unit 403, a data communication module 404, a third storage unit 405, a voice processor 407, and an image processor 409.

The third storage unit 405 includes a ROM for storing a control program controlling a general operation of the terminal of the rescue team; a RAM for temporarily storing data generated while the control program is enabled; and a hard disc for storing data and information received through the data communication module 404. The data communication module 404 is connected with the Internet network 55 to communicate data through the Internet network 55. The data communication module 404 receives the emergency safety request information through the Internet network 55, and outputs the received emergency safety request information to the controller 401. The controller 401 controls the general operation of the rescue team terminal. When the controller 401 receives the emergency safety request information from the data communication module 404, it detects the vehicle condition report data, the vehicle position report data and the image from the emergency safety request information, stores the detected information in the third storage unit 405, generates an alarm sound through the voice processor 407 to inform that there has been an emergency safety request, and displays the vehicle condition report data, the vehicle position report data and the image on the monitor 402. The alarm sound can be a monotonous alarm sound, or a voice alarm sound of "Emergency safety request is received. Take mobilization."

When the controller 401 receives a predetermined signal for informing that the emergency safety request has been received, from the input unit 403 in response to the generation of the alarm sound and the displaying of emergency safety request report data and the image, it generates and outputs an emergency safety reception signal to the data communication module 404. The data communication module 404 transmits the emergency safety reception signal to the service providing server 40 through the Internet network 55 and to the telematics device 10 through the mobile communication network 41. A control operation of receiving the emergency safety reception signal and transmitting the received emergency safety reception signal to the telematics device 10 through the mobile communication network 41 should be programmed in the control program of the service providing server 40.

In the telematics device 10, the telematics controller 11 receives the emergency safety reception signal through the mobile communication terminal 23 of the mobile communication network 41 and the interface unit 19, and displays a message of informing that the emergency safety request has been received and the rescue team has been mobilized, on the display unit 24. A control operation of receiving the emergency safety reception signal and informing that the emergency safety request has been received and the rescue team has been mobilized should be programmed in the control program of the first storage unit 12.

Figure 5:
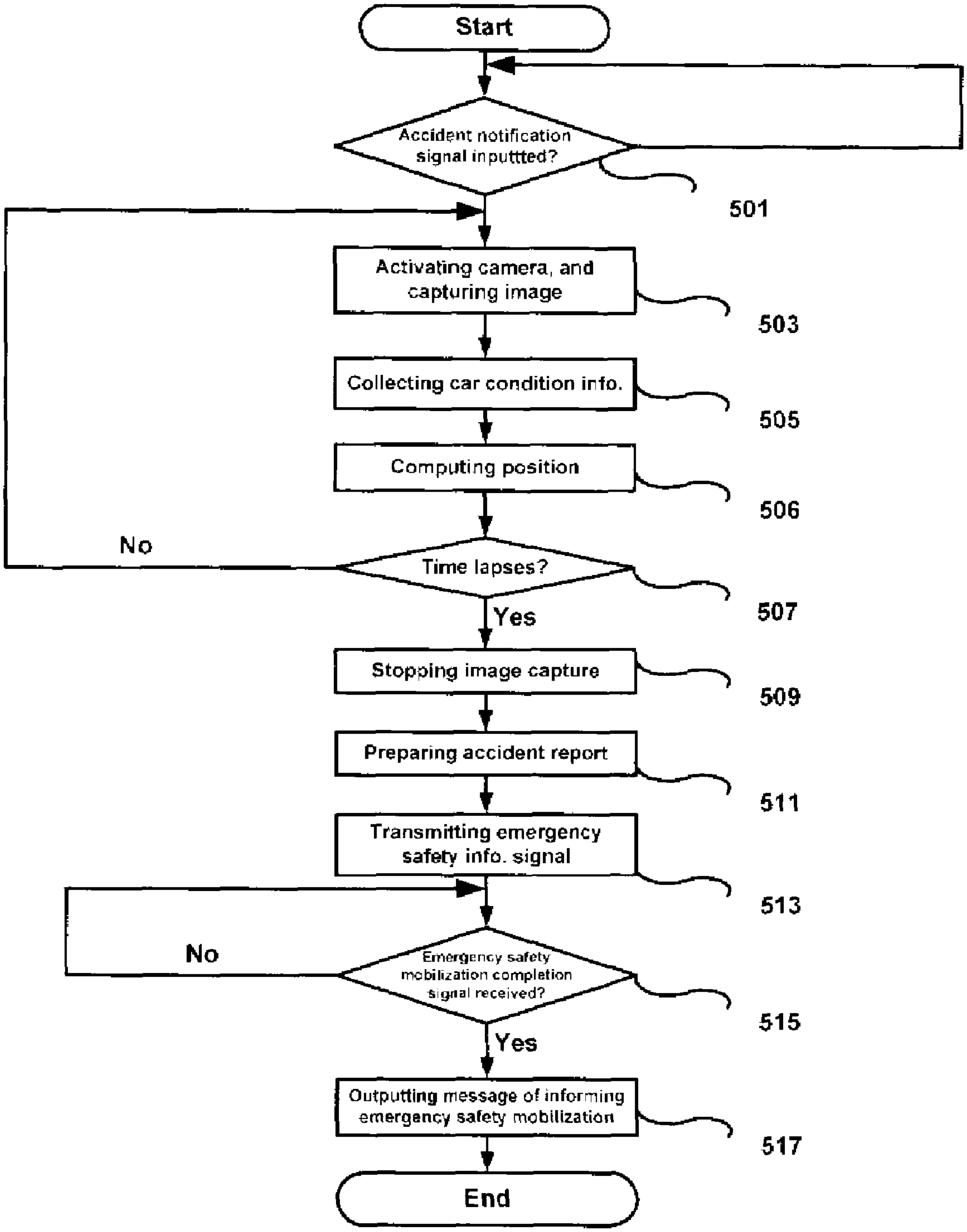
FIG. 5 is a flowchart illustrating an operation of a telematics device according to an embodiment of the present invention.

FIG. 5 is a flowchart illustrating an operation of the telematics device 10 according to an embodiment of the present invention. The operation of the inventive telematics device 10 will be described with reference to FIGS. 2, 5, 8 and 9 below.

In Step 501, the telematics controller 11 determines whether or not to receive an accident notification signal. The accident notification signal is an airbag signal inputted by the activation of the airbag from the vehicle condition detector 14, or key data generated by driver's pressing the emergency safety service key of the key input unit 13. In other words, the inventive emergency safety service is activated in the manual mode enabled by driver's key press, or in an automatic mode automatically enabled by sensing the activation of the airbag. The driver should previously set the manual mode and the automatic mode. After that, in Step 503, the telematics controller 11 activates the cameras of FIGS. 8 and 9, captures the image using the cameras, and stores the captured image in the first storage unit 12. Next, in Step 505, the telematics controller 11 controls the vehicle condition detector 14 to collect the vehicle condition information from the plurality of sensors (sensor 1, sensor 2, . . . , and sensor n) disposed inside or outside of the car, and stores the collected vehicle condition information in the first storage unit 12. After that, in Step 506, the telematics controller 11 computes the position of the car through the GPS receiver 17 and the position information processor 18, and stores the computed position information in the first storage unit 12. Next, in Step 507, the telematics controller 11 determines whether or not a predetermined time lapses. Until the predetermined time lapses, the telematics controller 11 continuously repeats the Steps 503, 505 and 506. When the predetermined time lapses, the telematics controller 11 stops the image capture of the cameras in Step 509, and prepares an accident report in Step 511. The accident report includes the vehicle information, the position information, the collected vehicle condition information, and the captured image. Next, in Step 513, the telematics controller 11 adds header information for informing that the car is placed in an emergency safety situation, to the accident report, and generates and transmits the emergency safety information signal to the wireless base station 31.

After that, in Step of 515, the telematics controller 11 determines whether or not to receive an emergency safety mobilization completion signal from the service providing server 40 through the mobile communication system 32 and the wireless base station 31. On the reception of the emergency safety mobilization completion signal, in Step 517, the telematics controller 11 displays on the display unit 24 that the emergency safety request has been completely received and the rescue team has been mobilized. Also, the telematics controller 11 can audibly output in voice using an audio processor (not shown) that an emergency safety request has been completely received and the rescue team has been mobilized.

Figure 6:
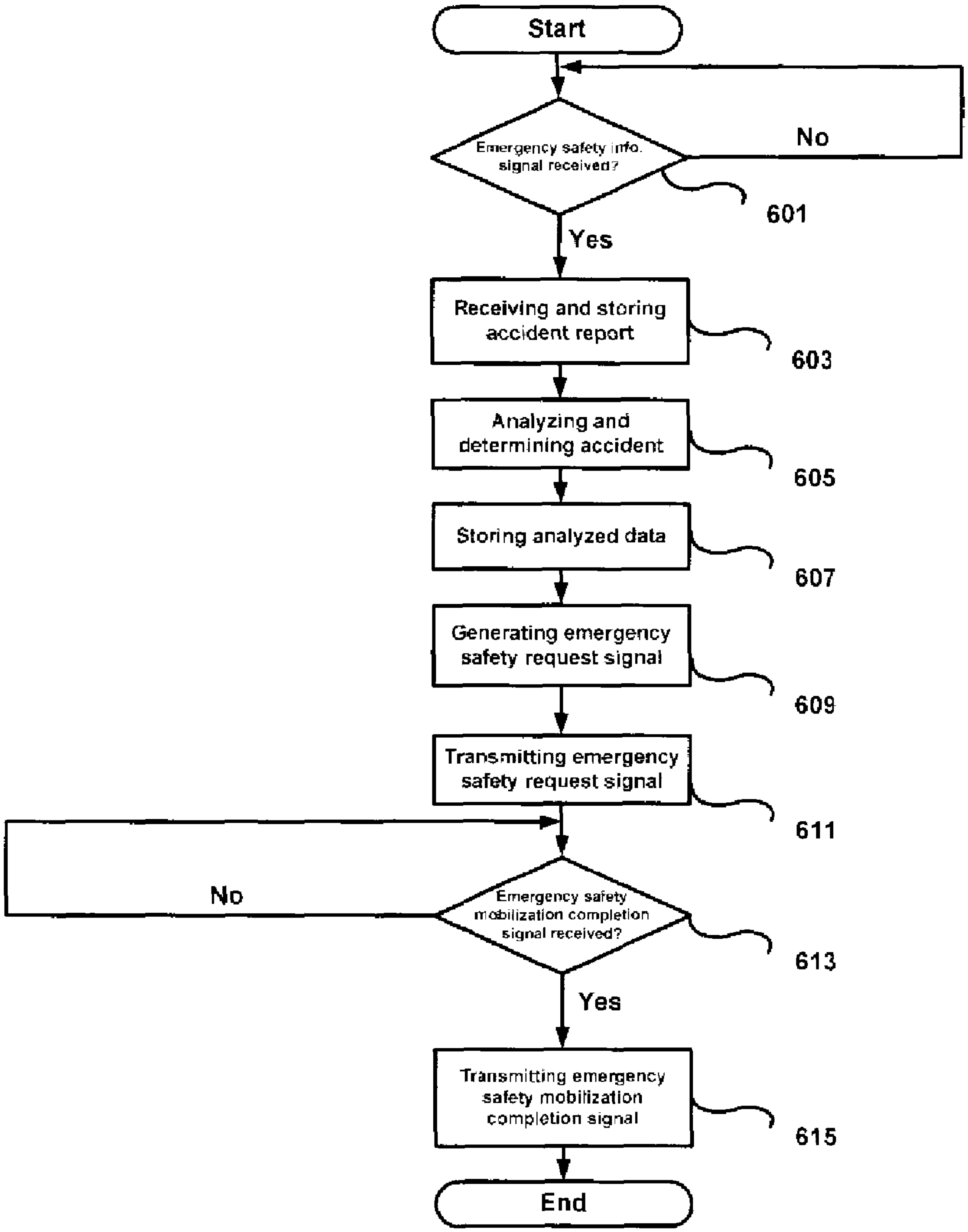
FIG. 6 is a flowchart illustrating an operation of a service providing server according to an embodiment of the present invention.

FIG. 6 is a flowchart illustrating an operation of the service providing server 40 according to an embodiment of the present invention. The operation of the service providing server 40 will be described with reference to FIGS. 3 and 6 below.

In Step 601, the service controller 43 determines whether or not to receive the emergency safety information signal through the communication module 42. The emergency safety information signal or not can be confirmed by checking a header of a reception signal. On the reception of the emergency safety information signal, in Step 603, the service controller 43 detects the accident report from the emergency safety information signal, and stores the detected accident report in the second storage unit 48. After that, the service controller 43 transmits the stored accident report to the accident analysis module 44. In Step 605, the accident analysis module 44 receives the accident report through the vehicle condition analyzer 45, the vehicle position analyzer 46 and the image analyzer 51, and separately analyzes each of the vehicle condition information, the vehicle position information and the image information. The analysis is to arrange only information on whether or not the traffic accident is serious, and information essential to emergency safety. In detail, the vehicle condition analyzer 45 can analyze from the detected vehicle condition information whether or not the accident vehicle is exploded. Through the map database 47, the vehicle position analyzer 46 can retrieve the nearest rescue teams to the accident car equipped with the telematics device 10 transmitting the emergency safety information signal. The image analyzer 51 detects the image data from the accident report. The detected image data can be analyzed and edited by a service providing server manager. The detected image data is stored in the second storage unit 48 in Step 607. After that, in Step 609, the service controller 43 generates the emergency safety request signal including the detected image data, and acquires the IPs of the retrieved rescue teams from the rescue team IP table of the second storage unit 48. Next, in Step 611, the service controller 43 transmits the emergency safety request signal to the corresponding rescue teams through the data communication module 49 and the Internet network 55. After that, in Step 613, the service controller 43 determines whether or not to receive the emergency safety mobilization completion signal from the Internet network 55 through the data communication module 49. On the reception of the emergency safety mobilization completion signal, in Step 615, the service controller 43 transmits the emergency safety mobilization completion signal to the mobile communication network 41 through the communication module 42. The emergency safety mobilization completion signal is transmitted to the telematics device 10 through the mobile communication system 32 and the wireless base station 31 of the mobile communication network 41.

Figure 7:
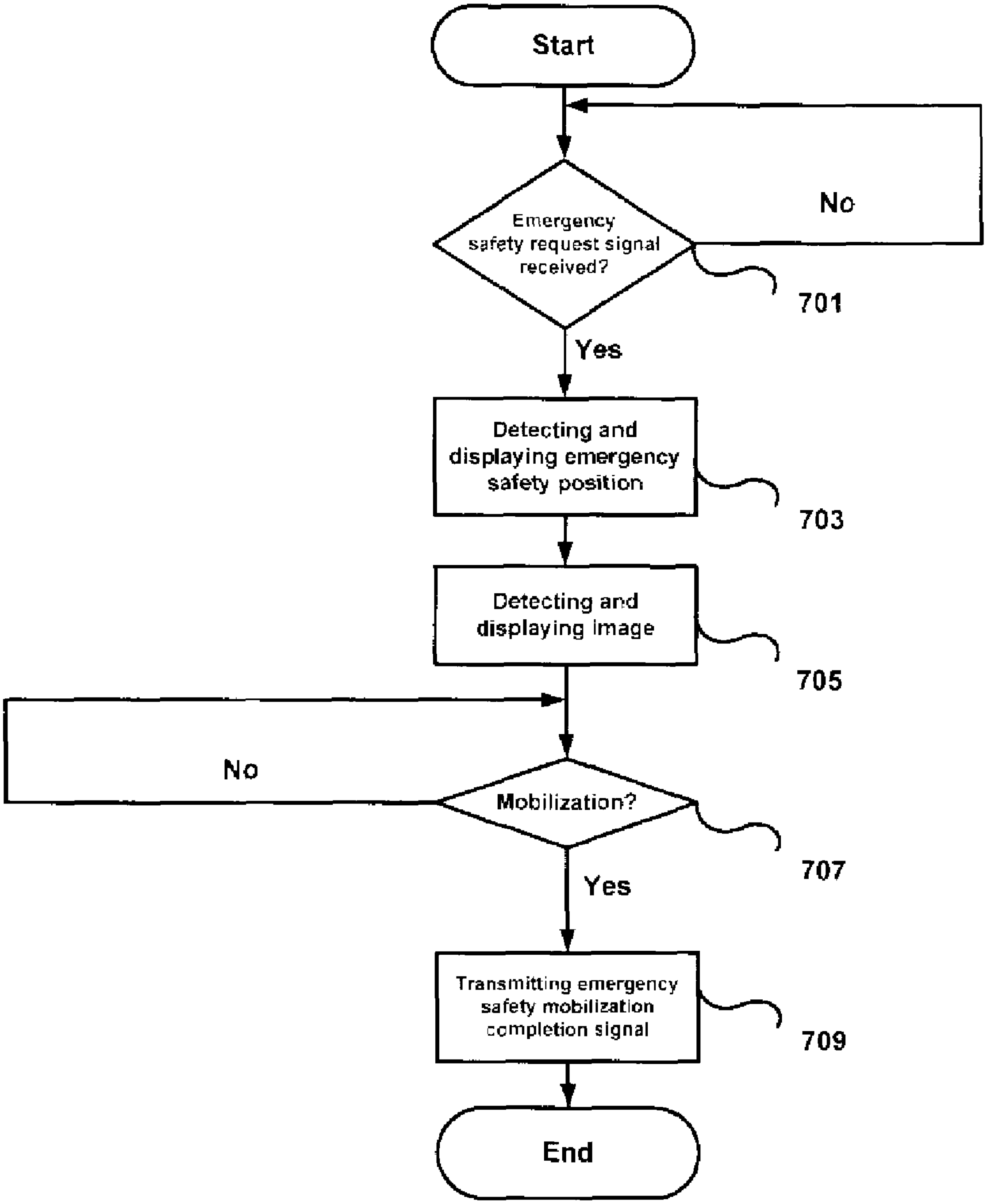
FIG. 7 is a flowchart illustrating an operation of an emergency safety informing device according to an embodiment of the present invention.

FIG. 7 is a flowchart illustrating an operation of the emergency safety informing device according to an embodiment of the present invention.

In Step 701, the rescue team controller 401 determines whether or not to receive the emergency safety request signal from the Internet network 55 through the data communication module 404. If it is determined that the emergency safety request signal is received from the service providing server 40, in Step 703, the controller 401 detects an emergency safety requested position from the emergency safety request signal, and displays the emergency safety requested position on the monitor 402. Next, in Step 705, the controller 401 detects the image data, and displays the emergency safety requested position on the monitor 402 using the detected image data. The emergency safety requested position and the image data can be concurrently displayed. After that, when a key or a mouse button is pressed to inform that the rescue team has been completely mobilized in Step 707, the controller 401 outputs the emergency safety mobilization completion signal to the data communication module 404 in Step 709. The data communication module 404 transmits the emergency safety mobilization completion signal to the service providing server 40 through the Internet network 55.

As described above, the present invention has an advantage in that when the traffic accident occurs, the rescue team is manually or automatically informed of the occurrence of the traffic accident, thereby preventing the confused driver from unnecessarily calling every rescue teams.

Further, the present invention has an advantage in that when the traffic accident occurs, the rescue team is automatically requested for emergency safety, thereby more quickly rescuing the driver from the dangerous situation.

Furthermore, the present invention has an advantage in that when the traffic accident occurs, all accident situations are recorded in an image format, thereby reducing conflict between the parties concerned and facilitating the arrest of a hit-and-run vehicle.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An emergency safety service system using a telematics system having a mobile communication network, the system comprising:

a telematics device for, on the generation of an accident notification signal resulting from a traffic accident, capturing an image from a peripheral situation of an accident scene, collecting condition information and position information of an accident car, and generating an emergency safety information signal having the condition information, the position information, and the captured image;

a service providing server for receiving the emergency safety information signal through the mobile communication network, recognizing and analyzing the position information from the emergency safety information signal, retrieving the nearest rescue teams to the accident car, and generating and transmitting an emergency safety request signal having the position information to the retrieved rescue teams through an Internet network; and a rescue team terminal for, on the reception of the emergency safety request signal through the Internet network, alarming that there is an emergency safety request, recognizing the position information from the emergency safety request signal, and displaying a position of the accident car, wherein the service providing server comprises:

a communication module for receiving the emergency safety information signal through the mobile communication network;

an accident analysis module for recognizing and analyzing the vehicle diagnosis information, the position information, and the image information from the emergency safety information signal under a predetermined control, generating a vehicle condition report, a vehicle position report, and image analysis information, and retrieving the nearest rescue teams to the accident car, from the position information;

a second storage unit for storing the detected vehicle diagnosis information, position information and image information, and storing an IP (Internet Protocol) mapping table for the rescue teams;

a data communication module for communicating data with the Internet network; and a controller for generating the emergency safety request signal having the vehicle condition report, the vehicle position report and the image analysis information, retrieving IPs of the retrieved rescue teams from the mapping table, and outputting the emergency safety request signal, using the retrieved IPs, to the data communication module through the Internet network.

2. The system according to claim 1, wherein the telematics device comprises:

a map database for storing map data;

a GPS (global positioning system) receiver for receiving GPS signals from a plurality of artificial satellites;

a position information processor for computing a position of the accident car from the GPS signals and map-matching the computed position to the map data to generate the position information;

a plurality of digital cameras installed outside and inside of the car; an image processor for collecting images from the digital cameras, and generating image information;

a plurality of sensors installed outside and inside of the car, and measuring a condition of the car;

a vehicle condition detector for receiving condition measurement values from the sensors, and generating vehicle diagnosis information;

a key input unit having an emergency safety service key;

an interface unit connected with a UART (Universal Asynchronous Transceiver and Receiver) of a mobile communication terminal, and interfacing signals communicated through the mobile communication network;

a first storage unit for storing the vehicle diagnosis information, the image information, and the position information under a predetermined control; and a telematics controller for receiving and storing the vehicle diagnosis information, the image information and the position information in the first storage unit, and generating and outputting an emergency safety information signal having the vehicle diagnosis information, the image information and the position information to the interface unit.

3. The system according to claim 2, wherein the accident notification signal is generated by pressing the emergency safety service key of the key input unit.

4. The system according to claim 2, wherein the accident notification signal is inputted from any one of the plurality of sensors.

5. The system according to claim 4, wherein the sensor generating the accident notification signal senses the activation of an airbag.

6. The system according to claim 2, wherein the image processor further comprises a jack connector connecting with a portable camera.

7. The system according to claim 1, wherein the accident analysis module comprises:

a vehicle condition analyzer for detecting the vehicle diagnosis information from the emergency safety information signal, checking a degree of a vehicle emergency situation from the detected vehicle diagnosis information, and generating the vehicle condition report;

a vehicle position analyzer for detecting the position information from the emergency safety information signal, generating the vehicle position report, and retrieving the nearest rescue teams to the car; and an image information analyzer for detecting and analyzing the image information from the emergency safety information signal.

* * * * *